US007076679B2

(12) United States Patent
Fischer et al.

(10) Patent No.: US 7,076,679 B2
(45) Date of Patent: Jul. 11, 2006

(54) SYSTEM AND METHOD FOR SYNCHRONIZING MULTIPLE VARIABLE-FREQUENCY CLOCK GENERATORS

(75) Inventors: Timothy C. Fischer, Berthoud, CO (US); Samuel Naffziger, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 469 days.

(21) Appl. No.: 10/679,786

(22) Filed: Oct. 6, 2003

(65) Prior Publication Data
US 2005/0076259 A1     Apr. 7, 2005

(51) Int. Cl.
*G06F 1/04*     (2006.01)
(52) U.S. Cl. .................. 713/501; 713/400; 713/600
(58) Field of Classification Search ................ 713/322, 713/400–501, 503, 600
See application file for complete search history.

(56) References Cited

U.S. PATENT DOCUMENTS

| 5,434,996 | A | * | 7/1995 | Bell ........................... 713/400 |
| 5,539,345 | A | * | 7/1996 | Hawkins ..................... 327/150 |
| 5,565,816 | A |   | 10/1996 | Coteus et al. |
| 6,323,714 | B1 |  | 11/2001 | Naffziger et al. |
| 6,720,673 | B1 | * | 4/2004 | Blanco et al. ................ 307/64 |
| 6,820,240 | B1 | * | 11/2004 | Bednar et al. ................ 716/1 |
| 2002/0038435 | A1 | | 3/2002 | Hironori et al. |
| 2002/0040443 | A1 | | 4/2002 | Maeda et al. |
| 2002/0104032 | A1 | | 8/2002 | Khurshid et al. |
| 2003/0112038 | A1 | | 6/2003 | Naffziger et al. |

FOREIGN PATENT DOCUMENTS

EP      0 478 132      4/1992
JP      11219237       8/1999

OTHER PUBLICATIONS

Foreign Search Report issued for GB 0 42 1932.5 dated Jan. 16, 2005.
French Search Report issued for FR 0407296 dated Nov. 14, 2005.

* cited by examiner

*Primary Examiner*—Dennis M. Butler

(57) ABSTRACT

In one embodiment, a central processing unit (CPU) includes multiple clock zones. Each clock zone includes at least one sensor that generates a signal indicative of a power supply voltage within the clock zone, a clock generator for providing a variable frequency clock to the clock zone, a first controller for controlling a frequency of operation of the clock generator in response to the at least one sensor, wherein the first controller further controls the frequency of operation in response to communication of frequency adjustments from first controllers in other clock zones within one cycle of latency, and a second controller that provides an overdrive signal, that is combined with adjustment signals from the first controller for the clock generator, in response to communication of frequency adjustments from other clock zones beyond one cycle of latency.

20 Claims, 3 Drawing Sheets

SYSTEM AND METHOD FOR SYNCHRONIZING MULTIPLE VARIABLE-FREQUENCY CLOCK GENERATORS

RELATED APPLICATION

The present application is related to concurrently filed and commonly assigned U.S. patent application Ser. No. 10/679,725, entitled "CENTRAL PROCESSING UNIT WITH MULTIPLE CLOCK ZONES AND OPERATING METHOD," which is incorporated herein by reference.

BACKGROUND

In a central processing unit (CPU), the operations of various logical components are controlled by a system clock which is generally generated utilizing a phase-lock loop (PLL). The operations of the various logical components are interrelated and, hence, various circuit path timing constraints typically exist. The actual timing associated with the circuit paths during operation of the CPU may depend upon the voltage supplied to the various components of the CPU. To ensure that the timing constraints are satisfied and that the CPU operates as expected, the frequency of the system clock may be selected according to worst-case criteria. In a relatively large and complex CPU, the supply voltage supplied to various components of the CPU may vary for a variety of reasons. If the frequency of the system clock is selected according to the worst-case criteria for all of the various components, system performance may be appreciably restricted.

SUMMARY

In one embodiment, a central processing unit (CPU) includes multiple clock zones. Each clock zone includes at least one sensor that generates a signal indicative of a power supply voltage within the clock zone, a clock generator for providing a variable frequency clock to the clock zone, a first controller for controlling a frequency of operation of the clock generator in response to the at least one sensor, wherein the first controller further controls the frequency of operation in response to communication of frequency adjustments from first controllers in other clock zones within one cycle of latency, and a second controller that provides an overdrive signal, that is combined with adjustment signals from the first controller for the clock generator, in response to communication of frequency adjustments from other clock zones beyond one cycle of latency.

DETAILED DESCRIPTION

Some representative embodiments are directed to systems and methods for providing variable frequency clocks to a plurality of zones within a CPU. Each zone may include one or several regional voltage detectors. In response to the detected voltages, the frequency of a clock generated for the respective zone may be varied as appropriate. The variation of the clock frequency may be implemented by a phase controller. When the phase controller changes its clock frequency, the phase controller may communicate the change to zones within one cycle of latency. Phase controllers receiving communication of a frequency adjustment may change their frequency during the next cycle to adapt to the frequency mismatch. Also, due to the communication latency, the other phase controllers address the phase mismatch generated by the difference in frequency that existed during the one cycle of latency.

In some representative embodiments, a sufficiently large CPU is employed to cause selected phase controllers to be disposed beyond one cycle of latency. Some representative embodiments utilize a respective hierarchical controller for each zone to address phase and frequency mismatch created when a particular phase controller, that is disposed beyond one cycle of latency, causes the clock frequency to be changed within its zone. To facilitate the discussion of some representative embodiments, the zone in which the original adjustment is made will be referred to as the "initiating" zone and all other zones will be referred to as "target" zones. As a result of an adjustment in an initiating zone in response to a voltage sensors, the target zones incur phase and frequency mismatch that are driven to zero. In some representative embodiments, the hierarchical controller interfaces with the phase controller to cause the phase and frequency mismatch to be driven to zero. Specifically, each phase controller may possess a limited capacity of adjusting the clock frequency of its zone for a single cycle. The hierarchical controller may utilize unused adjustment capability of the phase controller to drive phase and frequency mismatches associated with zones beyond one cycle of latency to zero.

Figure 1:
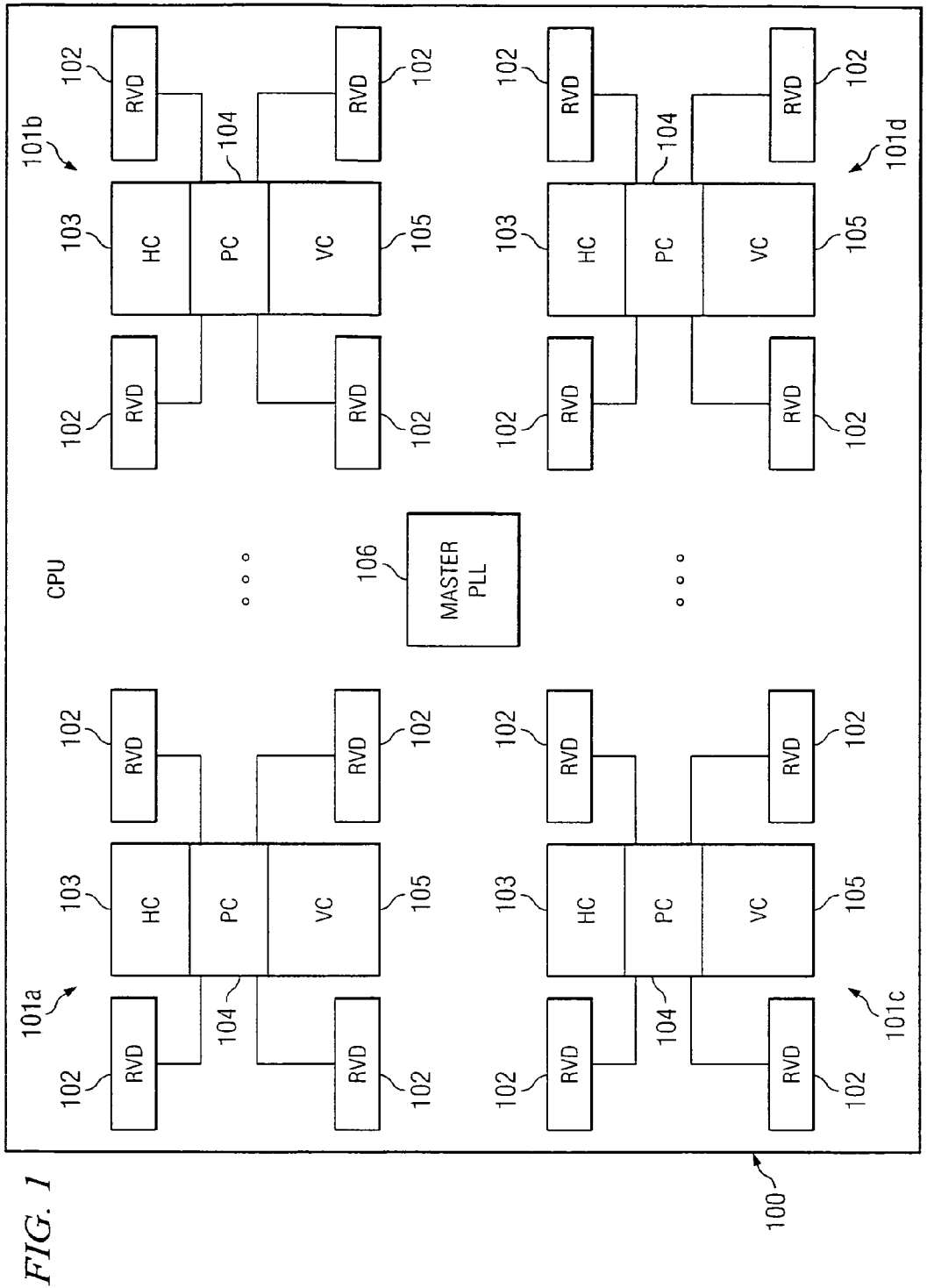
FIG. 1 depicts a central processing unit (CPU) with multiple clock zones.

FIG. 1 depicts CPU 100 at a relatively high level according to one representative embodiment. CPU 100 may contain, as is well known, a large number of functional blocks and components (which are not shown). CPU 100 includes structure for providing respective clocks to functional blocks and components according to a plurality of zones (shown as 101*a* through 101*d*). Zones 101*a* through 101*d* are separated from each other by varying amounts of communication latency. For example, zones 101*a* and 101*c* are separated by one cycle of latency and zones 101*b* and zones 101*d* are separated by one cycle of latency. Zones 101*a* and zone 101*c* are separated from zones 101*b* and 101*d* by more than one cycle of latency.

Each zone includes a respective variable clock generator 105. Variable clock generators 105 generate a local clock for the respective zone that is derived from master phase-locked loop (PLL) 106. In some representative embodiments, variable clock generators 105 may possess a limited capability of changing the frequency of the local clock within a single cycle. For example, variable clock generators 105 may be limited to adjusting their frequencies by changing the periods of their clocks by −1 "tick," +1 "tick," and +2 "tick," where a tick is a suitable fraction (e.g., ¹⁄₆₄th) of the period of the input clock from master PLL 106.

Each phase controller 104 receives input signals from one or several regional voltage detectors 102 (or, alternatively, thermal sensors) to control variable clock generators 105. Specifically, each regional voltage detectors 102 monitors the voltage of the CPU power supply within its localized area. When the voltage within the respective localized area drops crosses a threshold appropriate to ensure circuit path timing constraints within that localized area, regional voltage detector 102 generates a signal indicative of the voltage condition for communication to phase controller 104. Phase controller 104, in turn, provides a suitable signal to variable clock generator 105 to modify its frequency within the same cycle of receipt of the signal from regional voltage detector 102.

When one of phase controllers 104 (an initiating controller) causes a change in the frequency of the local clock within its zone, the phase controller 104 communicates this information to other phase controllers 104 (target controllers) within one cycle of latency. For example, phase controller 104 of zone 101a communicates its clock frequency adjustments to phase controller 104 of zone 101c. Because the communication occurs according to one cycle of latency, the clock associated with the target phase controller 104 that received the communication of the clock frequency adjustment is also out-of-phase relative to the clock associated with the frequency adjustment. To compensate for the phase misalignment, the target phase controller 104 temporarily adjusts the frequency of the clock beyond the communicated frequency adjustment to drive the phase misalignment to zero. When the phase misalignment is driven to zero, the target phase controller 104 causes another frequency adjustment (in the opposite direction) to cause the frequency of its local clock to match the frequency of the clock of the initiating phase controller 104.

Some representative embodiments utilize hierarchical controllers 103 to manage phase and frequency mismatches between zones that are separated by more than one cycle of latency. Moreover, because variable clock generators 105 are limited in their ability to adjust the periods of their clocks, hierarchical controllers 103 utilize adjustment capability that is unused by the phase controllers 104 to drive phase and frequency mismatches for zones beyond one cycle of latency to zero. Because hierarchical controllers 103 may not necessarily be able to cause a frequency adjustment at any particular time (due to conflicting adjustments by phase controllers 104), hierarchical controllers 103 may accumulate phase misalignment over multiple cycles to prevent permanent clock skew between zones 101.

Figure 2:
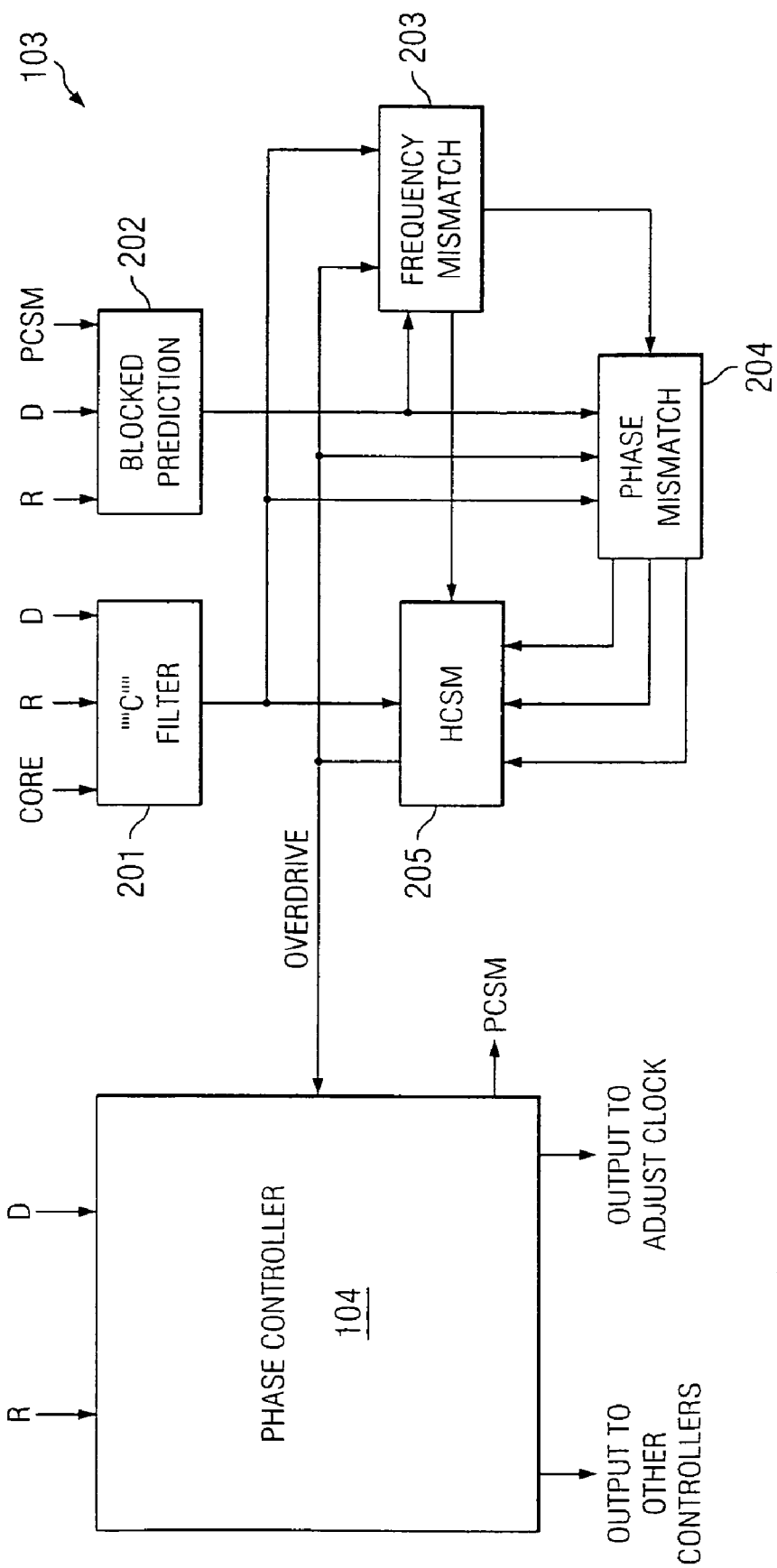
FIG. 2 depicts a hierarchical controller for synchronizing frequency and phase between clock zones.

FIG. 2 depicts an implementation of hierarchical controller 103 coupled to phase controller 104 according to one representative embodiment. A plurality of input lines provide signals to control the adjustment of the local clock. The "CORE" input line receives communication of frequency adjustments from other zones that are separated by more than one cycle of latency. The input line denoted by "R" receives signals from regional voltage detector(s) 102 associated with the local zone. The "D" line receives signals of frequency adjustments from other zones that are separated by one cycle of latency. The "PCSM" line is used to output the state of phase controller 104 from phase controller 104 to hierarchical controller 103.

"C" filter 201 processes signals received from the "R" line, the "D" line, and the "CORE" line. The purpose of "C" filter 201 is to filter communication of frequency adjustments that would cause a frequency adjustment that would be duplicative of the frequency adjustment already produced in response to signals from either or both of lines "R" and "D." Specifically, if a phase controller 104 in another zone communicates a frequency adjustment that occurred simultaneously with a frequency adjustment in the local zone, "C" filter 201 detects the occurrence and filters the remote frequency adjustment signal received from the CORE line.

Block prediction logic 202 receives signals from the "R", "D", and "PCSM" lines. From these signals, block prediction logic 202 determines whether any unused adjustment capability is available, i.e., whether phase controller 104 will independently cause a maximum adjustment upward or downward in the clock frequency. If no unused adjustment capability is available, block prediction logic 202 may generate a signal indicating that hierarchical controller 103 may only make a limited frequency adjustment (if at all) in the current cycle. In response to the signal from block prediction logic 202, frequency mismatch logic 203 implements functionality that tracks frequency mismatches over multiple cycles. For example, by utilizing frequency mismatch logic 203, hierarchical controller 103 may account for the possibility that frequency mismatches associated with remote frequency adjustments cannot be addressed immediately due to the lack of unused adjustment capability associated with phase controller 104. Likewise, phase mismatch logic 204 accumulates phase mismatch over multiple cycles.

Hierarchical controller state machine (HCSM) logic 205 generates an overdrive signal communicated to phase controller 104. The overdrive signal makes use of available frequency adjustment capability to drive frequency and phase mismatch between zones separated by greater than one cycle of latency to zero. The overdrive signal is communicated from hierarchical controller 103 to phase controller 104 where it is summed with the frequency adjustments of phase controller 104 subject to maximum adjustment capabilities.

Figure 3:
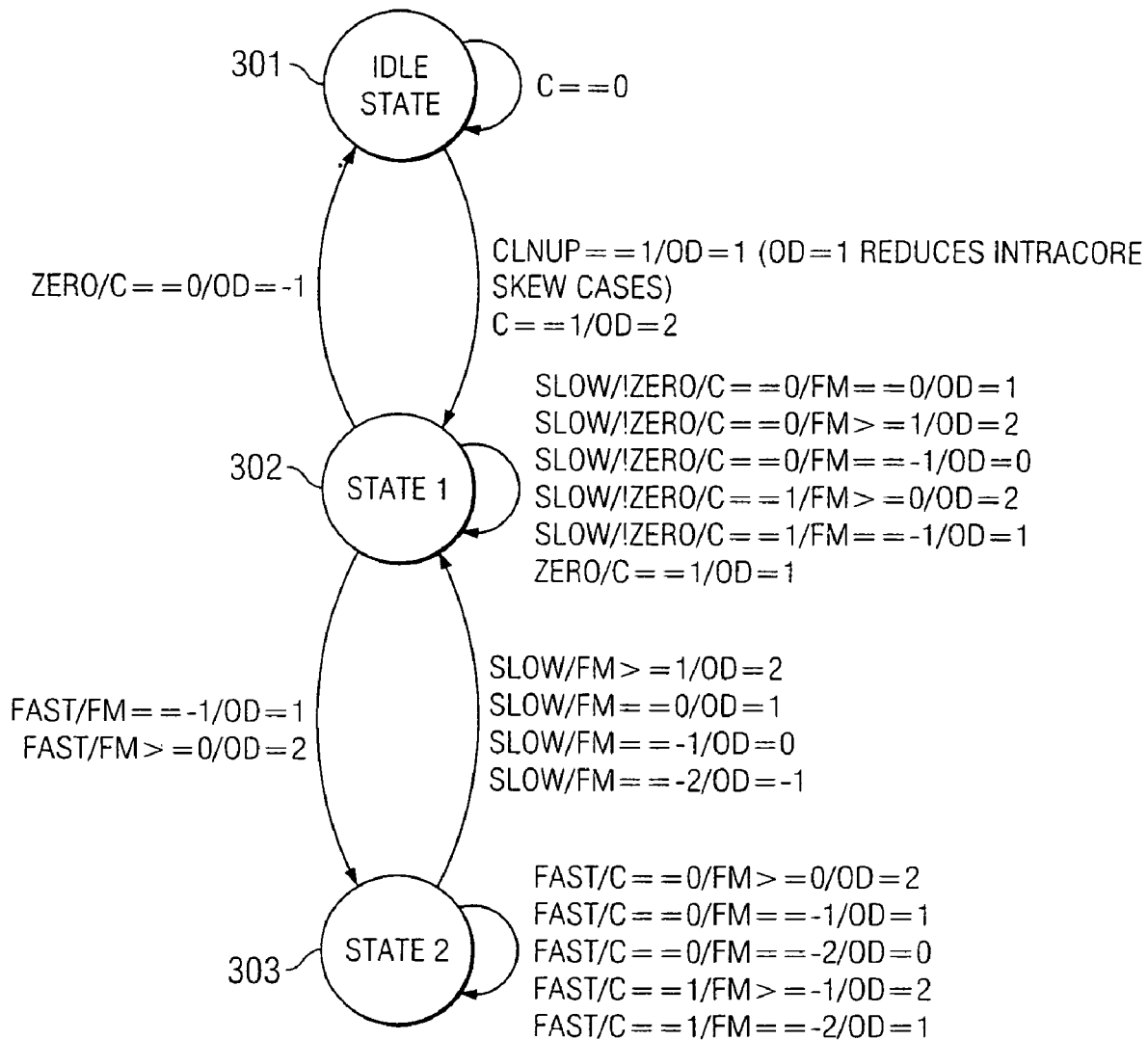
FIG. 3 depicts a Markov chain for a state machine for a hierarchical controller.

FIG. 3 depicts a Markov chain to represent the states and state transitions that may be implemented by HCSM logic 208 according to one representative embodiment. In the notation utilized for the state transitions, the term "C" refers to the filtered signal generated by filter 201. The term "FM" refers to the amount of frequency mismatch that exists between the local clock and the "virtual" clock zone, which represents where each clock zone's frequency and phase should be if instantaneous responses to all voltage sensors occurred. The term "PM" refers to the amount of phase mismatch that exists between the local clock and the virtual clock within CPU 100. "ZERO" refers to the condition in which phase mismatch (PM) equals zero, "SLOW" refers to the condition in which phase mismatch is greater than zero ticks and less than ten ticks, and "FAST" refers to the condition in which phase mismatch is greater than ten ticks. The term "OD" refers to the output to the phase controller 104 from hierarchical controller 103 that occurs during the cycle in which the state transition occurs.

State 301 represents the state in which HCSM logic 208 is not currently generating an overdrive signal for communication to phase controller 104. State 302 represents the state in which frequency and phase mismatches are driven to zero according to an ordinary state. State 303 represents the state in which phase mismatch is addressed according to a "fast approach" state. Specifically, if a sufficiently large frequency or phase mismatch is detected, HCSM logic 208 will attempt to drive the mismatch to zero as quickly as possible to attempt to maintain intercore clock skew within acceptable levels. Thus, the state transitions as shown in FIG. 3 largely depend upon whether that phase mismatch is greater than ten ticks (i.e., the FAST condition is present) and the amount of frequency mismatch. Although phase mismatch between various zones is not strictly limited to a predetermined discrete number of ticks, phase mismatch is limited due to the critically damped nature of the phase compensation. Specifically, statistical analysis may be utilized to demonstrate that clock skew (phase mismatch) between zones will be maintained at acceptable levels, in all but very rare circumstances, when a state machine is suitably implemented according to some representative embodiments.

Some representative embodiments may provide a number of advantages. Specifically, some representative embodiments enable relatively rapid responses to be made to voltage transients within a CPU. By enabling such responses, relatively small guard bands for timing issues are required. Likewise, worst case assumptions for analyzing timing constraints in CPU design are lessened. Some representative embodiments further enable such responses to occur on relatively large CPUs. Further, clock skew (phase mismatches) for various components within a large CPU may be maintained within acceptable levels by employing a suitable response to excessive phase mismatches associated with frequency adjustments.

What is claimed is:

1. A central processing unit (CPU) that includes multiple clock zones, said CPU comprising:
in each clock zone,
at least one sensor that generates a signal indicative of a power supply voltage within said clock zone;
a clock generator for providing a variable frequency clock to said clock zone;
a first controller for controlling a frequency of operation of said clock generator in response to said at least one sensor, wherein said first controller further controls said frequency of operation in response to communication of frequency adjustments from first controllers in other clock zones within one cycle of latency; and
a second controller that provides an overdrive signal, that is combined with adjustment signals from said first controller for said clock generator, in response to communication of frequency adjustments from other clock zones beyond one cycle of latency.

2. The CPU of claim 1, wherein said clock generator only implements limited clock adjustments per clock cycle.

3. The CPU of claim 2, wherein each local zone further comprises:
logic that determines an amount of clock adjustment of said clock generator that is unused by said first controller.

4. The CPU of claim 1 wherein each local zone comprises:
frequency mismatch logic for maintaining record of frequency mismatch between said clock zone and other clock zones; and
phase mismatch logic for maintaining record of phase mismatch between said clock zone and other clock zones.

5. The CPU of claim 4 wherein said second controller applies a larger frequency adjustment when phase mismatch recorded by said phase mismatch logic exceeds a threshold value.

6. The CPU of claim 1 further comprising:
a master phase-locked loop that generates a master clock, wherein each clock generator generates said variable clock frequency according to a clock period that is adjusted by a fraction of a period of said master clock.

7. The CPU of claim 1 wherein each local zone further includes:
a filter for filtering communication of frequency adjustments from other clock zones beyond one cycle of latency to account for concurrent frequency adjustments performed by said first controller in said local zone.

8. A method for operating a central processing unit (CPU) that includes multiple clock zones, said method comprising:
generating a respective variable frequency clock for each clock zone;
operating a sensor in each clock zone to generate a signal indicative of a power supply voltage within each respective clock zone;
adjusting, by a first controller, said respective variable frequency clock in each clock zone in response to said signal generated by said sensor;
adjusting, by said first controller, said respective variable frequency clock in each clock zone in response to communication of frequency adjustments in other clock zones within one cycle of latency; and
adjusting, by a second controller, said respective variable frequency clock by generating an overdrive signal, that is combined with adjustment signals from said first clock controller, in response to communication of frequency adjustments from other clock zones beyond one cycle of latency.

9. The method of claim 8, wherein each variable frequency clock may only be adjusted by a limited number of discrete adjustments per clock cycle.

10. The method of claim 9 further comprising:
determining a respective amount of clock adjustment capacity of each variable frequency clock that is unused by said respective first controller.

11. The method of claim 8 further comprising:
maintaining a record of frequency mismatch between each respective clock zone and other clock zones; and
maintaining a record of phase mismatch between each respective clock zone and other clock zones.

12. The method of claim 11 wherein each second controller applies a larger frequency adjustment when recorded phase mismatch exceeds a threshold value.

13. The method of claim 9 further comprising:
generating a master clock, wherein each variable clock frequency is varied by applying adjustments according to a fraction of a period of said master clock.

14. The method of claim 8 further comprising:
filtering, within each clock zone, communication of frequency adjustments from other clock zones beyond one cycle of latency to account for concurrent frequency adjustments performed by each respective first controller in said respective clock zone.

15. A central processing unit (CPU) that includes multiple clock zones, said CPU comprising:
in each clock zone,
at least one sensor means for generating a signal indicative of a power supply voltage within said clock zone;
clock means for providing a variable frequency clock to said clock zone;
first controller means for controlling a frequency of operation of said clock means in response to said at least one sensor means, wherein said first controller means further controls said frequency of operation in response to communication of frequency adjustments from first controllers means in other clock zones within one cycle of latency; and
second controller for generating an overdrive signal, that is combined with adjustment signals from said first controller means for said clock means, in response to communication of frequency adjustments from other clock zones beyond one cycle of latency.

16. The CPU of claim 15, wherein said clock means only implements limited clock adjustments per clock cycle.

17. The CPU of claim 16, wherein each local zone further comprises:
logic means for determining an amount of clock adjustment of said clock means that is unused by said first controller means.

18. The CPU of claim 15 wherein each local zone comprises:
- frequency mismatch means for maintaining record of frequency mismatch between said clock zone and other clock zones; and
- phase mismatch means for maintaining record of phase mismatch between said clock zone and other clock zones.

19. The CPU of claim 18 wherein said second controller means applies a larger frequency adjustment when phase mismatch recorded by said phase mismatch means exceeds a threshold value.

20. The CPU of claim 15, wherein each clock zone further comprises:
- means for filtering communication of frequency adjustments from other clock zones beyond one cycle of latency to account for concurrent frequency adjustments performed by said first controller in said respective clock zone.

* * * * *